UNITED STATES PATENT OFFICE.

ALEXANDER KEILLER, OF GOTHENBURG, SWEDEN, ASSIGNOR TO THEODOR LANGE, OF BRIEG, PRUSSIA, GERMANY.

PROCESS OF MAKING ZINC SULPHIDE.

SPECIFICATION forming part of Letters Patent No. 425,081, dated April 8, 1890.

Application filed November 12, 1889. Serial No. 330,057. (No specimens.) Patented in England April 11, 1888, No. 5,371, and in Germany March 27, 1889, No. 48,691.

*To all whom it may concern:*

Be it known that I, ALEXANDER KEILLER, a subject of the King of Sweden, residing at Gothenburg, in the Kingdom of Sweden, have invented a certain new and Improved Method of Producing Zinc Sulphide by Wet Process, (for which I have obtained a patent in England, April 11, 1888, No. 5,371, and my assignee, Theodor Lange, has obtained a patent in Germany, March 27, 1889, No. 48,691,) of which the following is a specification.

My invention relates to an improved method of producing zinc sulphide by wet process.

It is well known that in the production or precipitation of the zinc sulphide from neutral hydrated solutions of zinc salts by means of hydrothionic acid very imperfect results are obtained, and that with acid solutions of zinc salts no precipitation at all is obtained by hydrothionic acid, provided the free acid existing in the solution be one of the stronger acids. Nevertheless, from hydrated acetic solutions of protoxide of zinc, mixed with pure acetic acid, the zinc, in the form of zinc sulphide, is precipitated by means of hydrothionic acid.

By the improved process of my invention, the whole of the zinc contained in zinc salts soluble in water, with the exception of acetic zinc, may be obtained in the form of zinc sulphide, in the manner hereinafter described.

To the hydrated solution of zinc salts to be treated with hydrothionic acid, I add a suitable sulphate soluble in water and indifferent with reference to the hydrothionic acid. The following sulphates may with advantage be employed: sulphate of potassa, sulphate of soda, sulphate of alumina, sulphate of ammonia, and sulphate of magnesia. The exact quantity or proportion of such addition of one or several of these sulphates to the hydrated solution of zinc salt need not be stated, such quantity and proportion being variable. In general, such an addition, amounting to half of the weight of the zinc salt contained in the solution, will be found sufficient. The said addition of sulphate or sulphates having been dissolved within the hydrated solution of zinc salt, the hydrothionic acid is introduced, and by this means a perfect precipitation of all the zinc, in the form of insoluble zinc sulphide, is obtained in an easy and reliable manner. The hydrothionic acid $H_2S$ may be applied in the form of gas or as a hydrated solution without any difference of the effect.

Having now particularly described and ascertained the nature of my said invention and in what manner the same is to be performed, I declare that what I claim is—

The process of producing zinc sulphide, which consists in adding to a hydrated solution of a zinc salt an alkaline sulphate and hydrothionic acid, substantially as specified.

In testimony whereof I hereunto sign my name, in the presence of two subscribing witnesses, this 14th day of October, 1889.

ALEXANDER KEILLER.

Witnesses:
   E. GADELIUS,
   A. ERICKSSON.